INVENTORS:
LESTER O. KIELSMEIER
JAMES G. LEPRINO

BY: Dawson, Tilton, Fallon & Lungmus
ATT'YS

INVENTORS:
LESTER O. KIELSMEIER
JAMES G. LEPRINO
BY: Dawson, Tilton, Fallon & Lungmus
ATT'YS

3,531,297
MANUFACTURE OF PASTA CHEESE
Lester O. Kielsmeier, Wheatridge, and James G. Leprino, Gosden, Colo., assignors to Leprino Cheese Mfg. Co., Denver, Colo., a corporation of Colorado
Continuation-in-part of application Ser. No. 643,372, June 5, 1967. This application Oct. 7, 1968, Ser. No. 775,980
Int. Cl. A23c *19/02*
U.S. Cl. 99—116                          7 Claims

ABSTRACT OF THE DISCLOSURE

Pasta filata cheese is prepared by a process wherein cheddaring is substituted by soaking the curd, after draining the whey, in a water bath to reduce its internal pH and lactose content. Thereafter the curd is separated from the water bath and the separated curd is mixed in a confined zone under pressure.

CROSS-REFERENCE

Figure 1:
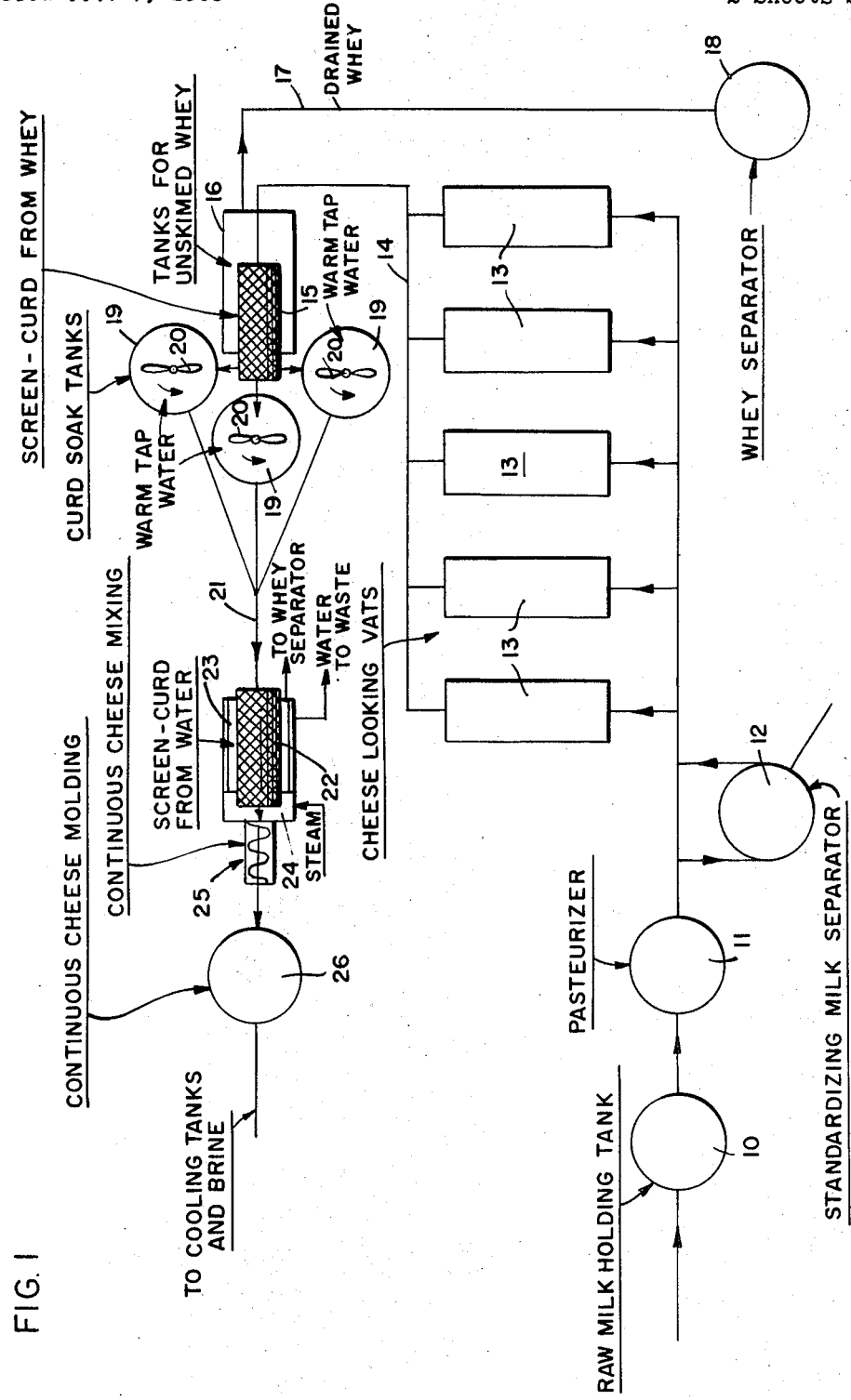

The present application is a continuation-in-part of our co-pending application Ser. No. 643,372, filed June 5, 1967, now abandoned.

BACKGROUND

In recent years, pasta filata cheeses suitable for use in making pizza has been produced in very large quantities in the United States. Such cheeses may be technically classified as mozzarella, provolone, or scamorze cheeses, but they are more generically termed pasta filata or "pizza" cheeses. The conventional process for preparing cheese of this general type is well known in the art. It is described in detail in Reinbold, Italian Cheese Varieties, vol. 1, Pfizer Cheese Monographs (1963).

The pasta filata or plastic curd-type cheese can be manufactured from skim or whole milk, or a mixture of skim and whole milk. The milk may be raw or pasteurized. The starter culture can be mixed heat-resistant lactobacilli, such as *S. thermophilus* and *L. bulgaricus*. *S. lactis* or a mixed lactic or a mixed lactic culture can be added. Depending upon the initial acidity of the milk, 1.5% or more starter may be required.

After a ripening period of from 30 to 50 minutes, enough rennet extract, diluted in water, is added to coagulate the milk in 30 minutes or less. About 2.5 oz. per 1,000 lbs. of milk can be used. The usual setting temperature is 80 to 92° F. Acidity at setting can be about 0.19% where the initial milk acidity is about 0.17%.

When the coagulum has reached the proper consistency, resembling that of cheddar cheese, it is carefully cut with curd knives. Whey acidity can be approximately 0.125%. The curd can be permitted to stand undisturbed for a short time before agitation to prevent loss in the whey. Agitation is then started, and aproximately 10 minutes after the curd is cut, cooking can commence. A temperature increase should be slow at first and then gradually accelerated. Cooking temperatures are determined by moisture level desired, acidity development, and fat content of the curd, but in general may vary from about 104 to 108° F. The desired cooking temperature should be reached in about 30 minutes.

After cooking, the curd is stirred for approximately 10 minutes at the desired temperature. Then it is permitted to settle to the bottom of the vat. Part of the whey is then drawn off of the vat, and stirring is resumed. After a brief stirring period of about 5 to 10 minutes, the curd is again permitted to settle to the bottom of the vat. The remainder of the whey can now be drawn from the vat. The duration of the "stir-out" is adjusted to increase the acidity, to reduce the moisture content to the desired content, and to obtain proper elasticity and firmness of the curd. Normally at least 30 to 45 minutes are required.

The drained curd is then subjected to a make procedure similar to that for cheddar cheese. In the dipping step, the acidity should be about 0.19%. As the whey is drawn from the vat, a trench is formed running through the curd down the center of the vat. The curd is leveled to form two uniformly size slabs, which are then subjected to a piling procedure, which regulates the moisture content and provides the characteristic body and texture of the curd.

After about 10 minutes, the slabs of curd are cut into blocks, which are then inverted, and angled toward the gate to facilitate drainage of the whey. After 10 to 15 minutes, they are turned again. Turning is then repeated every 15 minutes for a total elapse time of 1 hour and 15 minutes to 1 and ½ hour. In some instances, a longer interval may be required.

From 30 to 45 minutes after packing, the blocks of curd may be piled two high. Frequently, they are cut in half before this is done. After 30 minutes of piling two high, they are piled in layers three high, somewhat at the discretion of the cheesemaker. After the cheese blocks have obtained sufficient acid development and have changed from a rather soft, more or less springy but granular body to a plastic, smooth, fibrous material, the curd is ready for milling. The acidity at milling is usually approximately 0.70 to 0.8%.

In the milling operation, the individual blocks of curd are fed into a mill to be cut into smaller portions, which prepares the cheese for the important "pulling" operation in which the cheese is mixed and stretched at an elevated temperature in the presence of water. Conventionally, the milled curd particles are introduced into a stainless steel mixing bowl or into a sanitary dough mixing machine and water is added at about 180° F. Pieces are worked in the water until they become smooth, elastic and free from lumps. This may require the use of additional hot water and considerable effort by hand. Stretching or mixing must be thorough, and "marbling" in the finished product may be associated with incomplete mixing, too-low water temperature, or low-acidity curd, or a combination of these defects. The cheese is then ready for the finishing operations of molding, brining, and curing. Curing may be limited, since mozzarella or pizza cheese may be used immediately after processing.

THE PROBLEM

As can be seen from the foregoing summary, the conventional or standard procedure for the manufacture of pasta filata cheese, such as mozzarella or pizza cheese, is a relatively lengthy process, involving a great deal of hand manipulation of the cheese curd. It has long been desired to simplify the process for the manufacture of pizza-type cheese while still obtaining a product having the necessary "stringy" characteristic of such cheese, and having the proper moisture and acidity levels. Heretofore, however, following the cooking of the curd and the whey, the stir-out, dipping, piling and milling steps have therefore been standard practice, prior to the mixing or stretching of the curd.

There has also been a recognized need for improvement in the quality of pasta filata cheese, such as mozzarella or pizza cheese. For reasons which have not been fully understood, the conventional process results in a great variation in the character and quality of the cheese. For certain batches, the cheese may be satisfactory for use in making pizza, while in others with apparently identical conditions, cheese is not satisfactory and leads to complaints or rejections of the cheese by pizzerias or other users. Moreover, the shelf life or keeping qualities of the cheese is limited and variable.

Another problem encountered in the use of pizza cheese is the tendency of the cheese to burn or char during the baking of the pizza. This also varies from batch to batch of the cheese, some batches having greater tendency to burn or char than others, but in general, it has been desired to obtain a pizza cheese which is more resistant to burning. Sometimes, also, the sliced pizza cheese does not lay as flat on the pizza dough as would be desired, the cheese slices distorting or bubbling during cooking, and this can aggravate the problem of burning or charring.

SUMMARY OF INVENTION

The foregoing problems and difficulties have been substantially overcome by the improved process of the present invention for the manufacture of pasta filata cheese, and particularly mozzarella or pizza cheese. The manufacturing process is greatly simplified with a consequent reduction in manufacturing costs, while at the same time obtaining a pasta filata cheese product of improved quality, which can be produced uniformly and consistently from batch to batch.

The time and cost saving arises primarily from the elimination of the conventional cheddaring steps, including the necessary stir-out preparation for cheddaring and the milling of the blocks of curd after completion of the cheddaring. All these steps are made unnecessary without affecting the quality of the product, and, in fact, greatly improving the quality and uniformity of the product.

In practicing the improved process of the present invention, the mixture of cooked curd and whey can be prepared in the conventional manner, but thereafter the process involves a sharp departure from prior practice. Instead of the complicated stir-out and dipping procedures to prepare the curd for piling, the whey is simply drained from the curd such as by pumping the mixture over a separating screen. In other words, it is not even necessary to drain the curd in the vat, but instead the mixture of cooked curd and whey can be pumped directly from the vat to a continuous separating screen, such as a flat reciprocating screen or a cylindrical rotating screen, the whey passing through the screen, and the curd flowing off the screen efficiently free of whey for further processing according to the present invention.

In the essential next step in the process, the drained curd is immersed in a water soaking bath, which is maintained at an elevated temperature, such as a temperature in the range from 90 to 125° F. Usually, the preferred temperature will be at least 110° F. up to 120° F. In the soaking treatment, lactose is extracted from the curd into the water bath, preferably together with the extraction of lactic acid. The soaking of the curd is continued until the internal pH of the curd is reduced to a pH of at least 5.5 but no lower than 5.0. The curd should be protected from contact with highly acid solutions, such as those which have been proposed for treatment of cheddar curd (see U.S. Pats. Nos. 2,325,217 and 2,743,186). However, a small amount of acid, such as lactic acid, can be in the water of the bath during the soaking of the curd, as will result from the extraction of lactic acid from the curd.

The soaking step can be advantageously carried out by introducing the drained curd into water at a substantially neutral pH that is, ordinary tap water. More generally, the water of the water bath at the start of the soaking can have a pH in the range of 5-7. While an alkaline starting pH is not desirable, some alkalinity can be tolerated, since the lactic acid in the curd will be extracted, and will rapidly neutralize any alkalinity in the water, and reduce the pH to the desired amount.

The critical control point is the final internal pH of the curd, although, as will be understood, this will have a relation to the external pH of the water bath. At the start of the soaking, the curd will typically have a pH in the range of 6–6.5, and as the soaking continues, the internal pH of the curd should be reduced to a pH of at least 5.5 but not lower than 5.0. Correspondingly, then, the external pH (pH of the water bath) should not be so low that it is difficult to terminate the soaking without making the curd unduly acid. In general, the pH of the water bath should also be above 5.0 at the termination of the soaking step. For mozzarella or pizza cheese, it has been found that a final pH on the completion of the soaking step of substantially 5.4 is particularly advantageous.

During the soaking, the lactose content of the curd is drastically reduced. This occurs by the extraction of lactose into the water, and may also occur where active bacteria are present, as will usually be the case, by the bacterial conversion of lactose into lactic acid. The lactic acid formation can reduce the internal pH of the curd while at the same time being partially extracted into the water bath.

After the lactose has been largely extracted and the critical internal pH of the curd has been achieved, the curd is separated from the water of the bath. The separated curd can then be formed into a pasta filata cheese product by standard procedures, including the conventional mixing or stretching of the curd in the presence of hot water at about 180° F., followed by the steps of molding, brining, and curing, if desired. The resulting product will be of uniformly high quality, and is well adapted for use in making pizza. In particular, the shelf life is greatly extended, and, in the preferred embodiments, the quality of the cheese is actually improved by storage prior to use. In the baking of pizzas, the cheese has less tendency to char or burn, and in sliced form remains relatively flat on the pizza dough during baking.

In a preferred embodiment, the processing of the cheese subsequent to the soaking step is further improved. This permits the steps of mixing or stretching the curd to be performed continuously and semi-automatically, the hot plastic cheese being fed to a molding machine. In this embodiment, the suspension of the soaked curd in the water bath is pumped over a separator screen, such as a shaker screen or a rotating screen and the curd is separated and concentrated. The temperature of the curd is then increased to a temperature above 130° F., but lower temperatures can be used than in the prior art procedure. For example, the curd can be mixed at a temperature in the range of 130–150° F. While temperatures up to 180–190° F. can be used, the lower temperatures are preferred, and have been found to improve the quality and uniformity of the product.

In a preferred procedure, the separated curd is mixed in a water in a confined zone under pressure at a temperature in the plastic temperature range of the curd, such as 130–190° F., but preferably about 135–145° F. The mixed curd is then forced from the zone through a restricted outlet which controls the outflow and creates a back pressure. In this way, the curd is formed into a plastic mass ready for molding, and can be conveyed directly to a discharge head of a molding machine.

THE DRAWINGS

Figure 2:
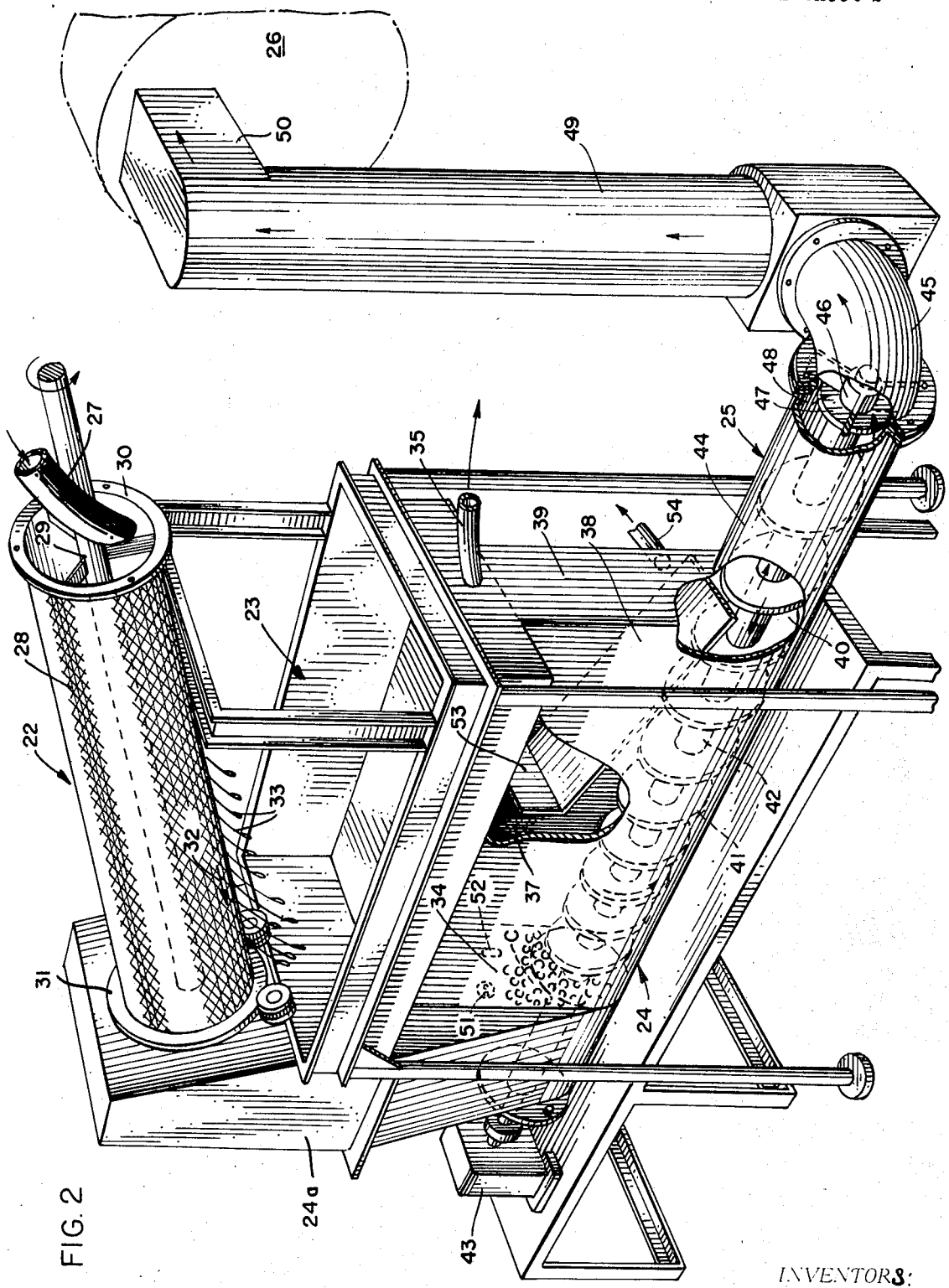

The process improvements of the present invention are illustrated in the accompanying drawings, wherein FIG. 1 is a diagrammatic flow sheet of a pasta filata cheese plant employing the distinctive steps of the present invention; and FIG. 2 is a perspective view of an apparatus for mixing and stretching the soaked curd and forming it into a plastic mass preparatory to molding in accordance with a preferred emobdiment of the present invention.

DETAILED DESCRIPTION

The process of this invention does not differ essentially from conventional pasta filata cheese-making processes up to the time following the cooking step when the whey is drained from the curd, and at this point the improvement of this invention over the prior art cheese-making processes is introduced. After the whey is drained from the curd, the curd, usually at a pH between about 6–6.5, is dumped into a water bath, which may be a neutral water bath at a temperature between about 95° F. and 125° F. It can be allowed to remain in the water bath for a period of about 45 minutes to one and one-half hours, or more specifically until the curd reaches a pH between about 5 and 5.5. After the desired pH has been reached, the water is drained from the curd, and the drained curd can be subjected to further processing in accordance with conventional practice, including the steps of mixing or stretching, molding, brining, and curing. The process of this invention does eliminate the conventional cheddaring steps, namely, dipping, piling, and mixing. The time for manufacturing each batch of cheese can therefore be substantially reduced. The final cheese product can be used immediately or after ageing for making pizza. It has also been found that the cheese produced by this method, after a relatively short ageing period, has greatly improved shelf life. Further, the pizza cheese product has the desirable flavor, good body texture, required moisture content and acidity, and is highly suitable for use in the making of pizza. A cheese suitable for the manufacture of pizza is also referred to as pasta filata or mozzarella cheese. The pH of the curd at the time of dumping into the leaching bath is preferably between about 6 and 6.35. The curd will ordinarily have attained a pH within this range during the conventional processing up to this point.

The temperature range of the water into which the curd particles are dumped for soaking and leaching can be between 90° F. and 125° F. At these soaking temperatures, lactic acid and lactose are effectively leached from the curd, resulting in a fine-textured product of uniform body. The leaching period can vary from about 45 minutes to one and one-half hours, depending on the temperature.

The pH range of the curd at the time of removing the curd from the water leach bath is from about 5 to about 5.5, with the preferred pH being substantially 5.4. When the curd has remained in the leach water the required time, it will have developed a pH of about 5.4, in a preferred process. At this pH, acid formation may have progressed almost to completion in the curd. The pH value is, of course, important in determining final flavor characteristics of the cheese, moisture content, texture and other properties.

The amount of water used in the water bath is not critical; however, more water than curd is used. For example the ratio by weight of curd to water can be within a range of 1 to 5, and a range of 1 to 4 is advantageous.

The process of the invention results in a number of factors which make it economically attractive. The cheddaring steps are omitted altogether and this saves time, labor and floor space. The curd and whey can be pumped through a shaker screen to separate the whey from the curd before the latter is dumped into the leaching bath. This is a labor-saving feature as it avoids transporting the curd by hand. The overall time for processing a batch of cheese can be reduced substantially thus resulting in improved production, and an overall saving in equipment and labor to provide a given output of manufactured cheese.

The pasta filata cheese products manufactured in accordance with the method of this invention have a close texture and an excellent body structure with very few mechanical openings. This results in a uniform weight to volume ratio, a highly desirable property in packaging cheese in small units. The cheese develops a good mild flavor in two to three months curing at 55° F. The moisture content can vary, such as from 48 to 50% moisture. The finished cheese, after a storage period of six months, shows no signs of deterioration.

The cheese made by the above described process has been used in large quantities in making pizza. There has been a noticeably reduced amount of burning, as compared to conventional pizza cheeses, when the cheese made by the method of this invention is heated to the high temperatures required to melt it in the manufacture of pizza. There is a minimum of blackening or carbon formation when the cheese is heated and it does not become tough on cooling, although it does have an acceptable amount of stringiness. The cheese product can be easily sliced and shredded. Upon cooling, it is soft enough to eat, and it possesses a minimum of stickiness. The cheese can be cured in 50% less curing time than conventional cheese. The shelf life of the cheese is greatly improved when stored with a reasonable moisture content, in contrast to conventional mozzarella cheese stored at the same moisture level.

In actual plant operations, it was found that the average overall time for processing each batch in accordance with the improved method of the invention was reduced by 30%. Since an average of 12 batches are run per day in the plant where the tests were made, this is a 30% saving in overall time in the manufacture of the daily output of cheese. This results in a 30% increase in production, with consequent saving in labor costs. Since the conventional cheddaring steps have been eliminated in this process, required equipment and floor space has been significantly reduced. Since a uniform cheese product is produced as automatic standardization is inherent in the process.

It is believed that the improved results provided by the invention stem from the precise control over the amount of acid and/or lactose in the final curd which the process provides. Leaching of the curd in the water bath performs two functions. It permits acid to develop in the curd by bacterial conversion of lactose, and it leaches excess acid and lactose from the curd. It is important to promote acid development and lactose extraction as nearly to completion as possible during the manufacture of the curd to produce a finished product with increased shelf life.

The process is in direct contradiction to the teaching of the prior art, as exemplified by U.S. Pats. 2,325,217 and 2,743,186, wherein the curd is soaked in a highly acid solution. This obviously increases the overall acid content of the curd. The objective of the present process is to foster the completion of acid development and leach excess lactic acid and lactose out of the curd. Because of the low lactose content of the curd produced by the present method, the finished cheese can be used immediately after manufacture as there is very little lactose remaining for the bacteria to work on to make acid and cause deterioration. During the process, the pH of the water bath may change from neutral to around 5.6 or lower, indicating that acid is extracted from the curd. This is in contrast to prior art processes, such as that disclosed in U.S. Pat. 2,743,186, in which the pH of the acid bath in which the curd is placed decreases, thus indicating that acid is being absorbed by the curd.

The process improvements of this invention are further illustrated by the following examples.

EXAMPLE I

The milk used was produced in the area around Denver, Colo. Pasteurized milk having a butterfat content between 1.5 and 2.8% was used in an amount of 10,000 lbs. per batch. The milk had the normal pH for milk, that is, about 6.6 to 6.7.

A 10,000 lb. batch of milk was heated in a steam jacketed vat to a temperature of 89° F. to 90° F. and a conventional mozzarella starter added. The temperature was maintained for about 30 minutes at which time rennet was added in an amount from 3 to 4 ozs. per 1,000 lbs. The temperature was maintained for about 15 minutes to permit the batch to set. The above operations up to the addition of the rennet were accompanied by stirring. After 15 minutes it was noted that the curd was sufficiently formed, at which time it was cut and cooked for 35 minutes at a temperature of about 110° F. When the curd had attained a pH of 6.2 separation of the whey from the curd was started. The curd and whey were conveyed through a shaker screen duct connecting the vat and a water bath. The duct was provided with an opening in its bottom near the water bath over which was secured a fine mesh screen so that the water would drain from the curd particles and the curd particles pass on into the water bath.

The water bath had a temperature of 110° F. and a neutral pH. The curd was allowed to remain in the water bath for 45 minutes, at which time it had developed a pH of 5.4. The water had developed a pH of 5.5. At this point the curd was separated from the water, and the further conventional processing steps of forming the cheese were performed on it, including mixing, pressing, and setting. If necessary, to halt further acid development, the molds used in subsequent processing steps to mold the cheese may be placed with the cheese in them in cold water at 40°–74° F.

It was found that the elapsed time for processing the batch had been reduced 30 minutes as compared to that for the conventional batch process originally used, and the pizza cheese product was of superior quality.

EXAMPLE II

To 10,000 lbs. of milk in the vat was added a conventional starter and the batch allowed to work at 90° F. for 30 minutes. At the end of this time 3.5 ozs. of rennet per 1,000 lbs. of milk were added with stirring for five minutes and then the batch allowed to set. At the end of 15 minutes, the curd had sufficiently formed and it was cut or diced in accordance with conventional practice. The batch was cooked at a temperature of 110° F. for a period of 35 minutes, at which time it had developed a pH of 6.1. The whey was then drained from the curd and the curd dumped into a water bath having a temperature of 100° F. and a neutral pH. The curd was left in the water bath an hour and 35 minutes, at which time it had developed a pH of 5.4. The pH of the water bath was 5.6. At this point, the curd was separated from the water and subjected to final processing in accordance with conventional procedures.

EXAMPLE III

In accordance with this invention, 30% F.D.B. low moisture part skim mozzarella cheese (maximum moisture 52%) can be made as follows:

Adjust butterfat level of milk to 1.5% in the vat if average test is at 3.5% or over. Add .75% *S. lactis* starter and 1% *S. thermophilus* and *L. bulgaricus* grown in pasteurized whey or milk. The high temperature bacteria should show a balance of approximately 3 thermophilus to 1 bulgaricus on microscopic examination. The *S. lactis* is being used in this case to condition Grade "A" milk or, in other words, help create conitions in the milk so that our actual working-bacteria can grow under optimum conditions in order to reach maximum activity. In this case, *S. lactis* will be killed off in the final high cooking temperature. Using *S. lactis* in this system may not be necessary under conditions similar to average manufacturing milk. In this case, a certain amount of acid production has taken place by streptococcus types that are regularly found in this milk.

Ripen the milk for approximately 30 minutes at 90° F. and coagulate with 3 oz. 50–50 rennet and pepsin per 1,000 lbs. milk. Make the usual long and cross cuts with ¼" curd knives. Let curd rest for 5–10 minutes. Curd will start to lose moisture rapidly at this point. Start to stir at low speed, wipe sides with squeegee, and bring to 114° F. in 25 minutes. Stir for 5 more minutes and draw whey, leaving approximately 40% of initial volume in vat. Break up curd by stirring and proceed to remove both curd and whey from vat. The pH of curd at this point should be 6.1–6.2. Curd and whey mix is pumped through a device to separate curd from whey with the curd being discharged into vertical tanks that have been charged with 118° F. water. A volume of water is used equal to 4 times the volume of curd added. The curd and whey mixture is kept suspended by a paddle arrangement rotated on a shaft that extends vertically to the bottom of the tank. At approximately 2.15 hrs. after setting the milk with rennet, the pH of the curd should be approximately 5.4, at which time the curd is ready to mix and mold.

The curd and water are separated by pumping over a device that will discharge water to sewer and curd to continuous mixing machinery. Hence, the curd is brought in contact with water at approximately 140° F. and by the action of an auger is stretched and compressed into a solid homogenous mass, and forced into the proper sized and shaped molds. The cheese is next cooled in flowing tap water sufficiently to retain its shape and dimensions when placed in cold 40° F. saturated salt brine—sodium chloride. After 24 hours, the cheese is put into plastic shrinkable bags. All the air is withdrawn and the end is closed with a clip to exclude entrance of oxygen. The package cheese is passed through hot water to shrink the bag and placed in corrugated boxes for storage and shipment.

Cheese in this way shows uniformly superior melting characteristics. The limited amount of lactose present in the finished cheese has the effect of limiting the reduction in pH and changes in texture. Total moisture content can be kept within legal limits. This cheese shows no tendency to develop the usual sour whey type flavors associated with ageing of this type. Shelf life with good handling characteristics is at least double the usual mozzarella or pizza traditional cheese. The method lends itself to a partially automated plant system whereas the product is never manually handled until finished. This results in considerable saving in labor and equipment, and floor space. The temperature control is better than in the traditional systems and makes it a great deal easier to maintain a tight schedule during a long operation.

EXAMPLE IV

Mozarella cheese is prepared as described in Example III, except that the separated curd is added to water having a lactic acid pH of 5.4 (0.04% acidity). As in Example III, the volume of the water is approximately four times that of the curd, and the temperature of the water is 118° F. After about two hours of soaking and stirring in the water, the internal pH of the curd is reduced to 5.3, the external solution pH is also 5.3. The curd and water are then separated as described in Example III, and the curd is further processed by mixing and molding to produce the final product, as previously described. The product has good flavor and texture, and is suitable for use as a pizza cheese.

Flow sheet

As indicated in the foregoing specification and examples, the process improvements of this invention permit a great improvement in plant layout and operating efficiency. This is more clearly illustrated by the flow sheet of FIG. 1, which shows a typical plant layout for preparing pasta filata cheese by the process of this invention. The raw milk is introduced into a holding tank 10, and then passed to a pasteurizer tank 11. If the fat content of the milk requires adjustment it can be passed through a standardizing milk separator 12 before being introduced into the cheese vats 13. In the illustration given, a battery of five vats is shown. It will be understood that this will be operated in sequence on a scheduled cycle. The operations in the cheese vats are carried out substantially as in prior practice, up to the cutting, mixing, and cooking of the curd. At this point in the process, the mixture of curd and whey (without separating any of the whey) is removed through a line 14, and passed to separating screen 15, which may be in the form of a rotating mesh cylinder, the mixture being introduced into the center of the cylinder, so that the whey passes through the cylinder into the collection tank 16 for removal through line 17 in passage to a whey separator 18. The curd relatively free of whey passes downwardly on the screen into one of the curd soak tanks 19. Either prior to or simultaneously with the introduction of the curd, warm water is introduced into the curd tank, and the mixture of warm water and curd is agitated by a slowly rotating agitator member, as indicated at 20. It will be understood that the temperature and pH conditions in the curd soak tanks 19 will be as previously described. After completion of the soaking, the mixture of water and soaked curd is passed through a line 21 to another separator screen 22, which also may be in the form of a rotating mesh cylinder. Beneath the screen 22 is a pan 23 into which the water drains from the curd. The partially drained and concentrated curd is discharged into an auger feed chute 24. The bottom of feed section 24 charges into a steam-heated auger unit 25. After being heated, mixed and compressed in the auger unit 25, the curd in the form of a plastic mass is passed to a continuous cheese molding unit 26, and thereafter, as indicated, the molded cheese cakes or blocks are passed to cooling and brining tanks (not shown).

The curd separating and continuous cheese mixing unit including the components 22, 23, 24 and 25 is shown in greater detail in FIG. 2. As will be seen, in the apparatus of FIG. 2, the auger unit 25 extends from the opposite end of the tank 23 and shown in FIG. 1, which is simplified for flow sheet illustration purposes. However, the intended operation is the same.

The mixture of curd and whey is introduced to the rotating screen unit 22 through a feed hose 27 the mesh cylinder 28 is supported on a central shaft 29, and rotates on trunnions 30 and 31. The outward extension of shaft 29 is driven by a motor through a gear reducer drive (not shown). Because of the downward inclination of the rotating screen 28, the curd moves along the lower portion thereof, as indicated by the arrow 32, while the whey drains through into the open top of pan 23, as indicated at 33. As the partially drained curd reaches the lower end of the screen 28, it is discharged into the top of hopper feed section 24a, which extends downwardly to the level of the auger unit 25, the auger unit extending along the bottom of a tank 24. As shown, the lower portion 34 of the feed hopper section 24a is in open communication with the lower portion of tank 24 and a common liquid level is maintained by the overflow dam 37, which extends upwardly between the sidewalls of the lower portion of tank 23 and includes an inclined lower section 38 extending between these sidewalls to the front wall 39 adjacent the top of the auger outlet opening 40 therein.

The auger unit 25 includes a mixing and conveying spiral element 41 mounted on a shaft 42 for rotation by a motor 43. Suitable bearings and seals are provided for the shaft 42. The projection of the auger unit 25 beyond tank front wall 39 is housed in a tubular jacket 44 which provides back-flow or recirculation clearance with the outer edges of the mixing and conveying element 41. The tubular section 44 discharges into an elbow section 45 adjacent the shaft bearing mounting 46. On the shaft 40 near the bearing 46 there is provided a back-pressure plate 47. The plate 47 can be stationary, being attached to the housing of bearing 46, or it can be mounted on the shaft 42 for rotation therewith. The plate 47 is of smaller diameter than the interior of jacket 44 and provides a restricted annular outlet 48 therebetween. Since the outlet 48 has substantially smaller cross-section than that of the interior jacket 44, it throttles the flow of the plastic cheese mass creating a back-pressure within jacket 44. The purpose of this method of functioning will be further described below.

The plastic cheese mass after being discharged into the elbow 44 passes upwardly to a vertically extending column 49 into a discharge head 50 for admission to the cheese molding unit 26 (not shown in detail).

The apparatus will now be described in terms of its method of functioning. The curd C collects in a relatively concentrated form in the lower portion 34 of the feed hopper section 24a, as indicated in the drawing. Water above and around the curd is maintained at a temperature within the plastic temperature range of the curd. With this kind of apparatus, the required temperature can be lower than in the prior art practice for mixing the stretching pasta filata curd, such as a temperature of 135–145° F. This temperature can be maintained by the direct introduction of live steam through a jet 51 controlled by a temperature sensing element 52. The condensed steam adds to the liquid volume and dilutes the residual whey which is introduced with the curd to hopper 24a. The curd at the desired temperature is moved along the lower portion of tank 24 by the auger element 41 being maintained at the desired temperature by contact with the water held within the tank by the dam 37. Excess water overflows the dam as indicated at 53 and is discharged to waste through an outlet 54. Whey is discharged from pan 23 through an outlet 35 to a whey separator.

As the curd is conveyed along by the auger element 41 it is mixed and stretched. As the curd is moved into the confined zone provided by the jacket 44, it is subjected to superatmospheric pressure, and the curd particles are compressed together to form a continuous plastic mass. As previously explained, the pressure within the jacketed zone is provided by the back-pressure creating orifice-type plate 47. Because of the clearance provided between the inside of jacket 44 and the outer edges of auger 41, back-flow of curd can occur along the periphery of the enclosed space, while the main mass of curd is carried forwardly, as indicated by the arrows in FIG. 2. The mixing under pressure within the zone of the jacket 44 is the most important part of the mixing process, and the curd should be at a temperature at which it can be formed into a plastic mass under the applied pressure. Because of the pressure within the jacket 44, curd temperatures as low as 130–150° F. can be used, whereas in prior practice with an open mixer, temperatures as high as 180–190° F. were required to form the plastic mass. The mixed and compressed curd is forced out from the zone of the jacket 44 through the restricted back-pressure creating outlet 48. This process assures that the curd is continuously formed into a plastic mass ready for molding, the curd mass being conveyed to the molding unit, as previously described.

From the foregoing description of FIGS. 1 and 2, it will be appreciated that the plant can be operated with a minimum of manual handling or manipulation of the curd. By using appropriate pumps and control valves, the mixture of curd and whey from the vats 13 can be passed to the screen 15, and introduced into one of the tanks 20. The mixture of soak water and curd from the tanks 20 by the use of appropriate pumps and valves can be passed to the screen 22. From that point on, the curd moves automatically and continuously by means of the auger unit 25 to the molding unit 26.

The process of this invention has a further advantage in providing a means for control of rate of acid development. In the case of unpredictable or abnormally fast acid development, the conventional process provides no satisfactory means of control. The usual practice is to mill the curd back into the vat, and flood the curd with cold water to slow down the activity of the starter organisms. However, this procedure generally produces a cheese that has abnormally high moisture, which may be difficult to warehouse and which may fail to meet the required standards.

With the process of the present invention, if abnormal acid development occurs, the mixture of curd and whey can be heated in the vat to a somewhat higher temperature than normal, and charged to the curd soaking tanks at this higher temperature. For example, a temperature in the range of 120–125° F. can be used. This higher temperature will somewhat inhibit growth of the starter organisms and thereby reduce the rate of acid development. In extreme cases, a temperature in the range of 125–130° F. can be used, but usually a temperature above 126° F. will not be required. After soaking the curd at the higher temperature, the soaked curd is then processed as previously described. The higher soaking temperature may somewhat reduce moisture content, but this is not seriously objectionable. Additional curing can be used where required. The resulting cheese will be of good quality and will meet the required standards for maximum moisture content.

While in the foregoing specification this invention has been described in relation to specific examples and preferred embodiments thereof, it will be apparent to those skilled in the art, that the invention is susceptible to additional embodiments, and that many of the details set forth herein can be varied considerably wtihout departing from the basic principles of the invention.

We claim:

1. In the process for making a pasta filata cheese exhibiting typical pasta filata stringiness, wherein a mixture of curd and whey is obtained, the mixture is cooked, and the whey is separated to obtain cooked, drained curd particles ready for cheddaring, said curd particles having an internal pH of about 6 to 6.5, the process improvement characterized by substituting for cheddaring, the steps of:
   (a) immersing said cooked drained curd in a water soaking bath while the curd is developing acidity, the water in said bath being at a temperature in the range from 90 to 125° F. and at a pH above 5.0 to around 7; and
   (b) extracting lactose from said curd into said water bath while soaking said curd therein at said temperature, said soaking and extraction being continued for a time sufficient to extract most of the lactose from said curd and to reduce the internal pH of said curd particles to a pH of substantially 5 to 5.5;
whereby the resulting curd is ready for the steps of the pasta filata cheesemaking process which follow cheddaring.

2. The process improvement of claim 1 in which said soaking bath is at a temperature in the range of 100 to 120° F. and at a pH above 5.4 during the said soaking and extracting of said curd.

3. The process improvement of claim 1 in which the said soaking and extracting of said curd is terminated and said curd is separated from the water of said bath when the internal pH of said curd is about 5.4.

4. In the process for making a pasta filata cheese exhibiting typical pasta filata stringiness, wherein a mixture of curd and whey is obtained, the mixture is cooked, and the whey is separated to obtain cooked drained curd particles ready for cheaddaring, said curd particles having an internal pH of substantially 6 to 6.35, the process improvement characterized by substituting for said cheddaring, the steps of:
   (a) immersing said cooked drained curd in a water soaking bath while the curd is developing acidity, the water in said bath being at a temperature of from 100 to 120° F., said bath when said curd is first immersed therein having a substantially neutral pH; and
   (b) extracting lactose from said curd into said water bath while continuing to soak said curd therein at said temperature, said soaking and said extraction being continued for a time sufficient to extract most of the lactose from said curd and to reduce the internal pH of said curd to a pH of substantially 5 to 5.5;
whereby the resulting curd is ready for the steps of the pasta filata cheesemaking process which follow cheddaring.

5. The process improvement of claim 4 in which the said soaking and extracting of said curd is terminated and said curd is separated from the water of said bath when the internal pH of said curd is substantially 5.4.

6. In the manufacture of a pasta filata cheese wherein conventional process steps are employed up to the usual cheddaring steps to produce cooked drained curd particles having an internal pH of about 6 to 6.5, the process improvement characterized by the steps of:
   (a) immersing said cooked drained curd without cheddaring in a water soaking bath while the curd is developing acidity, the water in said bath being at a temperature in the range of from 90 to 125° F. and at a pH above 5.0 to around 7;
   (b) extracting lactose from said curd into said water bath while continuing to soak said curd therein at said temperature, said soaking and said extraction being continued for a time sufficient to reduce the internal pH of said curd to a pH of substantially 5 to 5.5;
   (c) separating said curd at said internal pH from most of the water of said bath;
   (d) heating said curd particles by contact with heated water to a temperature in the plastic temperature range of said curd while mixing and stretching said curd; and
   (e) continuing the said mixing and stretching under superatmospheric pressure and while forcing the mixed curd through a restricted back pressure creating outlet;
whereby a plastic curd mass is obtained having typical pasta filata stringiness.

7. The process improvement of claim 6 in which the said mixing and stretching of said curd is at a temperature of 135 to 150° F.

References Cited

UNITED STATES PATENTS

| | | | |
|---|---|---|---|
| 2,733,148 | 1/1956 | Russo | 99—116 |
| 3,117,008 | 1/1964 | Mauk | 99—116 |
| 3,242,571 | 3/1966 | Langford | 31—46 X |
| 3,403,030 | 9/1968 | Pontecorvo et al. | 99—116 |
| 3,421,220 | 1/1969 | Stanga | 31—46 |
| 3,445,241 | 5/1969 | Pontecorvo et al. | 99—116 |

LIONEL M. SHAPIRO, Primary Examiner

D. M. NAFF, Assistant Examiner

U.S. Cl. X.R.

31—89; 99—243